July 21, 1959  A. AVENDAÑO LOPEZ  2,895,523
OPPOSITELY THREADED UNITS HAVING BENDABLE LOCKING TABS
Filed June 29, 1956

INVENTOR.
ALFREDO AVENDAÑO LOPEZ
BY
Attorneys

United States Patent Office 2,895,523
Patented July 21, 1959

2,895,523

OPPOSITELY THREADED NUTS HAVING BENDABLE LOCKING TABS

Alfredo Avendaño Lopez, Madrid, Spain

Application June 29, 1956, Serial No. 594,825

Claims priority, application Spain July 5, 1955

1 Claim. (Cl. 151—18)

The present invention relates to an arrangement for locking a nut upon a threaded shaft, more particularly to a nut-locking arrangement wherein a threaded shaft has both right and left-hand threads thereon and threaded fastening devices each having reverse hand threads from each other are threaded into contacting relationship upon said shaft and prevented from relative rotation with respect to each other.

It is the principal object of this invention to provide a novel and improved locking device for preventing the unloosening of nuts.

Another object of this invention is to provide an arrangement for locking nuts upon a threaded shaft in which the use of a jam nut is eliminated.

It is a further object of this invention to provide an arrangement for preventing the unloosening of nuts upon a threaded shaft which is based upon an opposite relationship of the hands of the threads on the locking device from the hand of the nut.

It is an additional object of this invention to provide a novel and improved arrangement for preventing the relative rotation of adjacent nuts threaded upon the same shaft.

Other objects and advantages of this invention will become apparent upon reference to the accompanying description when taken in conjunction with the following drawings wherein.

Figure 1:
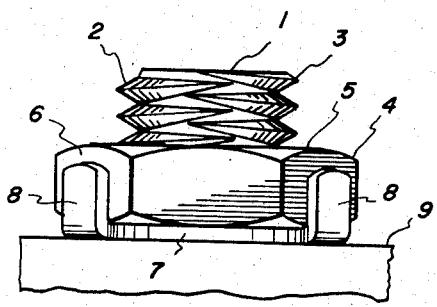
Figure 1 is an elevational view of the nut and bolt arrangement in accordance with this invention which prevents loosening of a threaded fastening device.

Returning now to the drawings and more particularly to Figure 1 wherein like reference symbols indicate the same parts throughout the various views, 1 indicates a shaft or bolt having threads 2 of one hand and threads 3 of a reverse hand. Threads 2 and 3 are superimposed upon each other so that it is possible to screw nuts of either hand upon the shaft 1.

A hexagonal control nut 4, having faces 5 and flats 6, is threaded upon the shaft 1. The control nut 4 has internal threads which may be of either hand 2 or 3.

Figure 2:
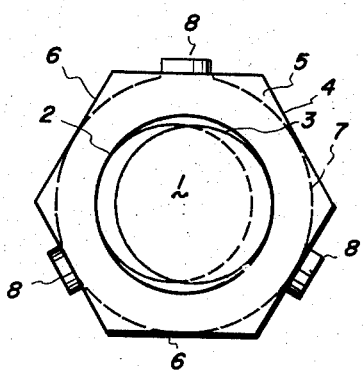
Figure 2 is a top plan view of the embodiment illustrated in Figure 1.
Figure 4:
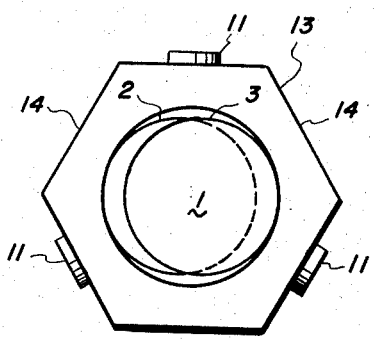
Figure 4 is a top plan view of the modification illustrated in Figure 3.

Positioned beneath the control nut 4 is a supporting socket 7 which is essentially in the shape of a thin washer-like element (as may be more clearly seen by the dotted outline in Figure 2) and has a height which is considerably less than the height of the control nut 4. A plurality of wings or tabs 8 extend radially outward from the periphery of the supporting socket 7. The tabs 8 are adapted to be bent into the vertical position as shown in Figure 1 so as to engage the corresponding flats of the control nut 4.

The supporting socket 7 is also internally threaded with the hand of the thread being the same as the hand of the thread of the control nut 4. Because of the small mass and thinness of the supporting socket 7, there will only be a single thread or a few helical internal projections on the edge of the bore of the supporting socket 7 which are the equivalent of an intermittent helical thread.

In using the arrangement of Figure 1, the supporting socket 7 is first placed upon the threaded shaft and the nut 4 is then positioned upon the socket. After threading the nut and supporting socket against a surface 9 so as to form a tight fastening the tabs 8 are bent upwardly to the position shown in Figure 1. Thus, if there is a tendency for the control nut to become unloosened or unthreaded, it will also rotate the supporting socket with it. In view of the single thread on the supporting socket, this thread will become locked against the thread of the threaded shaft and tend to lock the entire arrangement of the nut 4 and supporting socket 7 against rotation. The presence of internal threads upon the supporting socket serves as a positive blocking action for the supporting socket and the control nut 4.

The use of the supporting socket which is essentially a thin, spring-like washer with tabs thereon, is a more economical arrangement than the use of a second locking or jamming nut. The cost of manufacturing a supporting socket as disclosed herein is considerably less than the cost of manufacturing a second nut.

Figure 3:
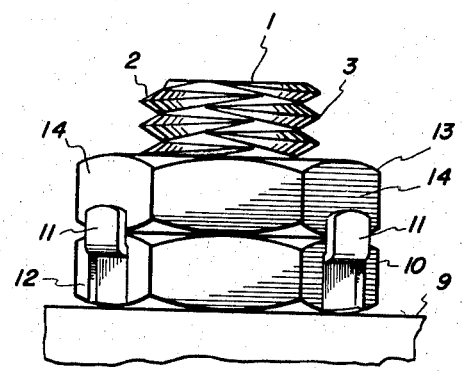
Figure 3 is an elevational view of a modification of the arrangement illustrated in Figure 1 wherein both a fastening nut and a control nut are used.

Proceeding next to the modification illustrated in Figure 3, there is similarly shown the threaded bolt 1, having threads 2 of one hand and threads 3 of the reverse hand thereon. There is a locking or fastening nut 10 which is first threaded upon the bolt 1. The fastening nut 10 has a plurality of tabs 11 which are cut from flats 12 thereof. These tabs 11 are bendable and are adapted to be bent upwardly in the position shown in Figure 3.

Positioned immediately above the fastening nut 10 is a control nut 13. The control nut 13 is similar to the fastening nut 10 except for the absence of the tabs and by having an internal thread of the reverse hand from the thread of the fastening nut 10.

In using the locking arrangement of Figure 3 the fastening nut 10 is first threaded upon the bolt 1. The control nut 13 is subsequently threaded upon the bolt 1 by rotating in a direction contra to that employed in threading the fastening nut 10 upon the bolt. When the control nut has been threaded into a position adjoining that of the fastening nut 10, as illustrated in Figure 3, the bendable tabs 11 are bent upwardly to engage the corresponding flats 14 of the control nut. This arrangement prevents relative rotation between the fastening nut and the control nut. Since the fastening nut and the control nut must be rotated in opposite directions in order to be withdrawn from the bolt 1, it can be seen that by preventing relative rotation of these nuts with respect to each other the fastening nut 9 will be prevented from becoming unloosened. Thus, this locking arrangement is entirely dependent upon preventing relative rotation between the pair of nuts which have threads of the opposite hands thereon. No jamming or locking action of the nut with respect to the threads upon the bolts is necessary.

Other means for preventing relative rotation between the fastening nut 10 and the control nut 13 may be readily employed. Such means may consist of links pivotally mounted on one end thereof to the fastening nut 10 adapted to be pivoted upwardly to engage corresponding slots in the flats of the control nut 13.

An alternative arrangement would comprise inserting pins in cooperating holes drilled through each of the fastening and control nuts.

Thus it can be seen that the present invention provides an improved locking arrangement for nuts which depends largely upon preventing the rotation of the nut rather than jamming the nut against the threads of the bolt. By jointly employing the principle of reverse hand threads upon the bolt and nuts threaded thereon, each having opposite hands from each other, and a subsequent prevention of rotation between the two nuts, it can be seen that a simple, economical, and effective nut locking arrangement is achieved.

It will be understood that this invention is susceptible to modification in order to adapt it to different usages and conditions, and, accordingly, it is desired to comprehend such modifications within this invention as may fall within the scope of the appended claim.

What is claimed as this invention is:

In a nut-locking arrangement, a uniform-diameter bolt having a shank with threads of opposite hand superimposed upon each other with said threads being coextensive, the shank of said bolt projecting outwardly of a surface on which the nut-locking arrangement is being used, a fastening nut with threads of one hand threaded upon said shank against said surface and having flat outer wrench engaging sides, a control nut having threads of the opposite hand from said fastening nut threaded upon said shank against said fastening nut, and a plurality of bendable tabs of uniform thickness cut in the flats of said fastening nut intermediate the edges of the flats so as to leave the edges solid and having a height less than the height of the flats, the upper ends of said tabs adjacent said control nut being attached to said fastening nut and the bottom ends of said tabs being bent upwardly against the flats of said control nut to prevent relative rotation therebetween, said tabs in the normal inoperative unbent position being flush with the flats of said fastening nut whereby said fastening nut can be received in a socket wrench and can be used as a control nut, the said control and fastening nuts being similar in size and shape so that the tabs of said fastening nut are bent upwardly to engage corresponding faces of said control nut to assure locking of said nuts.

References Cited in the file of this patent

UNITED STATES PATENTS

| | | |
|---|---|---|
| 330,471 | Desmond | Nov. 17, 1885 |
| 478,019 | Pettegrew | June 28, 1892 |
| 829,363 | Berry | Aug. 21, 1906 |
| 831,602 | Cookerley | Sept. 25, 1906 |
| 854,260 | Wooddell | May 21, 1907 |
| 904,956 | Higginbotham | Nov. 24, 1908 |

FOREIGN PATENTS

| | | |
|---|---|---|
| 8,544 | Great Britain | June 3, 1884 |
| 11,511 | Great Britain | July 18, 1889 |